United States Patent
Löwstedt et al.

(10) Patent No.: US 12,496,915 B2
(45) Date of Patent: Dec. 16, 2025

(54) VEHICLE FUEL CELL SYSTEM

(71) Applicant: VOLVO TRUCK CORPORATION, Gothenburg (SE)

(72) Inventors: Carl Löwstedt, Onsala (SE); Johan Lindberg, Gothenburg (SE); Fredrik Rahm, Hörby (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 432 days.

(21) Appl. No.: 18/048,654

(22) Filed: Oct. 21, 2022

(65) Prior Publication Data
US 2023/0140817 A1 May 4, 2023

(30) Foreign Application Priority Data
Oct. 28, 2021 (EP) ..................................... 21205165

(51) Int. Cl.
| | |
|---|---|
| *B60L 50/72* | (2019.01) |
| *B60L 58/30* | (2019.01) |
| *F17C 9/00* | (2006.01) |
| *H01M 8/04082* | (2016.01) |
| *H01M 8/04089* | (2016.01) |

(Continued)

(52) U.S. Cl.
CPC .............. *B60L 50/72* (2019.02); *B60L 58/30* (2019.02); *F17C 9/00* (2013.01); *H01M 8/04089* (2013.01); *H01M 8/04201* (2013.01); *H01M 8/0444* (2013.01); *H01M 8/04753* (2013.01); *H01M 8/04932* (2013.01); *F17C 2205/0323* (2013.01); *F17C 2221/011* (2013.01); *F17C 2250/032* (2013.01);
(Continued)

(58) Field of Classification Search
CPC .. B60L 2200/36; B60L 2240/66; B60L 50/72; B60L 58/13; B60L 58/30; B60L 58/40; F17C 2205/0323; F17C 2221/011; F17C 2250/032; F17C 2250/0447; F17C 2270/0168; F17C 2270/0184; F17C 9/00; H01M 16/006; H01M 2250/20; H01M 8/04089; H01M 8/04201; H01M 8/0444; H01M 8/04455; H01M 8/04626; H01M 8/04753; H01M 8/04932; H01M 8/0494; H01M 8/0687; Y02E 60/50; Y02T 90/40
See application file for complete search history.

(56) References Cited

U.S. PATENT DOCUMENTS

2002/0136935 A1   9/2002   Iwasaki

FOREIGN PATENT DOCUMENTS

| CA | 3021696 C | * | 6/2021 | ............. B01D 53/30 |
|---|---|---|---|---|
| CN | 102335552 A |   | 2/2012 | |

(Continued)

OTHER PUBLICATIONS

Machine translation JP2004055260A (Year: 2004).*

(Continued)

*Primary Examiner* — Victoria H Lynch
(74) *Attorney, Agent, or Firm* — Venable LLP; Jeffri A. Kaminski

(57) ABSTRACT

The fuel cell system includes a fuel cell arranged to receive ambient air at a cathode inlet, and a tank arrangement fluidly connectable to the cathode inlet. The fuel cell system is configured to supply oxygen based fluid from the tank arrangement when a toxic substance level of the ambient environment is above the predetermined threshold limit.

11 Claims, 4 Drawing Sheets

(51) Int. Cl.
*H01M 8/0444* (2016.01)
*H01M 8/04746* (2016.01)
*H01M 8/04858* (2016.01)

(52) U.S. Cl.
CPC ............... *F17C 2250/0447* (2013.01); *F17C 2270/0168* (2013.01); *F17C 2270/0184* (2013.01); *H01M 2250/20* (2013.01)

(56) References Cited

FOREIGN PATENT DOCUMENTS

| | | |
|---|---|---|
| DE | 102017219478 A1 | 5/2019 |
| DE | 102018201815 A1 | 8/2019 |
| JP | 2004055260 A | 2/2004 |

OTHER PUBLICATIONS

Machine translation DE102017219478A1 (Year: 2019).*
Extended European Search Report in corresponding European Application No. 21205165.0 dated Apr. 28, 2022 (8 pages).
Chinese Office Action dated May 31, 2025 in corresponding Chinese Patent Application No. 202211251948.5, 17 pages.

\* cited by examiner

VEHICLE FUEL CELL SYSTEM

TECHNICAL FIELD

The present invention relates to a vehicle fuel cell system. The present invention also relates to a vehicle comprising such a fuel cell system and a method of controlling a vehicle fuel cell system. Although the invention will mainly be directed to a vehicle in the form of a truck using a fuel cell for generating electric power to an electric traction motor, the invention may also be applicable for other types of vehicles at least partially propelled by an electric traction motor, such as e.g. an electric vehicle, a hybrid vehicle comprising an electric machine as well as an internal combustion engine for propulsion.

BACKGROUND

The propulsion systems of vehicles are continuously developed to meet the demands from the market. A particular aspect relates to the emission of environmentally harmful exhaust gas. Therefore, vehicles propelled by electric machines receiving electric power from hydrogen fuel cells have been increasingly popular, in particular for trucks and other heavy duty vehicles.

Conventionally, the fuel cell comprises an anode side and a cathode side. The anode side receives hydrogen gas, while the cathode side receives an oxidizing agent, e.g. air received from the ambient environment. The fuel cell typically comprises an electrolyte that allows ions to move between the anode and cathode sides. At the same time, electrons flow from the anode to the cathode producing electric current.

However, the fuel cell vehicle may, from time to time, be operated at areas where the ambient air contains toxic substances. This may, for example, be the case when the vehicle is driven in tunnels, etc. where the conditioning of the ambient is relatively poor. The toxic substances are negatively affecting the fuel cell. The production of electric current as well as the operational lifetime of the fuel may be reduced.

It is therefore a desire to protect the fuel cells from toxic substances while at the same time maintaining a desirable production of electric current from the fuel cell.

SUMMARY

It is thus an object of the present invention to at least partially overcome the above described deficiencies.

According to a first aspect, there is provided a vehicle fuel cell system, comprising a fuel cell configured to generate electric power, the fuel cell comprising an anode side and a cathode side, wherein the anode side comprises an anode inlet configured to receive a hydrogen gas, and wherein the cathode side comprises a cathode inlet configured to receive air, a first air intake conduit having a first end portion connected to the cathode inlet and a second end portion, the second end portion being configured receive air from an ambient environment, a tank arrangement configured to comprise an oxygen based fluid, the tank arrangement being fluidly connectable to the cathode inlet via a second intake conduit, and a control unit connected to the tank arrangement, the control unit comprising control circuitry configured to receive a signal indicative of a level of toxic substances present in the ambient environment, compare the toxic substance level with a predetermined threshold limit, and control the tank arrangement to supply oxygen based fluid to the cathode inlet when the toxic substance level is above the predetermined threshold limit.

The wording "oxygen based fluid" should be construed as a gas comprising an oxidizing agent. The oxygen based fluid may, for example, be dioxygen ($O_2$), air, nitrous oxide ($N_2O$), etc.

Further, the toxic substance should be construed as an air pollution which could potentially be harmful for the fuel cell. The toxic substance may, for example, be carbon dioxide ($CO_2$) present in the ambient air. The toxic substance which may negatively affect the fuel cell may also be carbon monoxide (CO), nitrogen oxides (NOx), sulphur oxides (SOx), etc. Thus, any type of chemical compound that could be present in the ambient air operated by the vehicle and that, when received by the cathode side of the fuel cell, negatively affect the operation of the fuel cell.

Furthermore, the signal indicative of the level of toxic substances present in the ambient environment may, as is also described further below, be received from a sensor configured to sense the presence and level of toxic substances, i.e. pollution, in the ambient air. Such a sensor is thus able to measure the air quality. However, the signal indicative of the level of toxic substances may be received by other means than a sensor. For example, and as will also be described in further detail below, the presence and level of toxic substances may be received from other vehicle(s) in advance, where the other vehicle(s) has recently operated the road ahead of the vehicle. Thus, a vehicle-to-vehicle (V2V) communication between vehicles can inform the vehicle that it is about to enter an area with a high level of toxic substances. The signal may also be received by vehicle-to-infrastructure (V2I) communication. As a still further example, the signal may be received by map data of the vehicle in combination with statistic toxic level data of certain areas on the map, or map data in combination with logged data from the ego vehicle. The logged data is thus data of toxic substance levels at positions of the map where the vehicle has been previously operated. The signal may also be based on certain time periods of the day, and specific days at which certain areas are more polluted than other.

The present invention is based on the insight that by controllably suppling clean oxygen based fluid to the cathode side of the fuel cell when the vehicle operates in an environment containing an increased level of toxic substances, the fuel cell is protected from the harmful substances while at the same time being able to generate electric power in a desirable manner. Thus, the operational functionality of the fuel cell is maintained. Based on the level of toxic substance currently present in the ambient air, the oxygen based fluid may be used to either dilute the ambient air provided into the cathode inlet, i.e. a combination of ambient air and oxygen based fluid from the tank arrangement is supplied to the cathode inlet. If the toxic substance level is severely high, the control circuitry may prevent ambient air to be delivered to the cathode inlet, whereby only oxygen based fluid from the tank arrangement is supplied to the cathode inlet. Accordingly, the flow of oxygen based fluid supplied to the cathode inlet may be proportional to the level of toxic substances present in the ambient environment. Hence, and according to an example embodiment, the air tank arrangement may be prevented from supplying oxygen based fluid to the cathode inlet when the level of toxic substances in the ambient environment is below the predetermined threshold limit.

According to an example embodiment, the second intake conduit may be connected to the first intake conduit at a position between the first and second end portions of the first intake conduit. Hence, the tank arrangement is connected to the first intake conduit at a position upstream the cathode inlet. Hereby, the ambient air can be diluted with the oxygen based fluid before entering the cathode inlet.

According to an example embodiment, the tank arrangement may comprise a valve, the valve being controllable between a first state in which oxygen based fluid from the tank arrangement is supplied to the cathode inlet, and a second state in which oxygen based fluid in the tank arrangement is prevented from reaching the cathode inlet.

According to an example embodiment, the first conduit may comprise a flow controller device connected to the control unit, the flow controller device being configured to controllably supply air from the ambient environment to flow from the second end portion to the first end portion.

According to an example embodiment, the control circuitry may be further configured to control the flow controller device to reduce the flow supply of air from the ambient environment from the second end portion to the first end portion when the toxic substance level is above the predetermined threshold limit.

Hereby, the flow controlled device may either prevent air from the ambient environment to reach the cathode inlet when the toxic substance level is too severe, or to admit a reduced level of air from the ambient environment to reach the cathode inlet if the toxic substance level is less severe. According to an example embodiment, the flow controller device may be one of an air booster or a valve.

According to an example embodiment, the vehicle fuel cell system may further comprise a sensor configured to determine the level of toxic substances in the ambient environment, wherein the control circuitry being configured to receive the signal indicative of the toxic substance level present in the ambient environment from the sensor. As an alternative, the level of toxic substances may be received from map data. In such a case, the map data is preferably correlated with statistic data relating to level of toxic substances at positions previously operated by the vehicle, or other vehicles sharing statistic data.

According to an example embodiment, the predetermined threshold limit may be a first predetermined threshold limit, the control unit being connected to the fuel cell, wherein the control circuitry is further configured to compare the toxic substance level with a second predetermined threshold limit, the second predetermined threshold limit being higher than the first predetermined threshold limit, and control the fuel cell to reduce generation of electric power when the toxic substance level is above the second predetermined threshold limit. Hereby, and as a precautionary measure, the operation of the fuel cell is reduced as there may be a risk that the ambient air is accidentally provided into the cathode side of the fuel cell.

Furthermore, the reduction of generation of electric power may also be based on the state of charge (SOC) level of an energy storage system of the vehicle. For example, the control unit may reduce the operation of the fuel cell, i.e. the generation of electric power, to a greater extent if the SOC level is high compared to when the SOC level is low. Thus, an increased amount of oxygen based fluid needs to be supplied from the tank arrangement to the cathode inlet when operating the vehicle at a location with high toxic substance level in the ambient air while having a low SOC level in the energy storage system. Other parameters are also incorporated in the control unit for determining the amount of oxygen based fluid to be supplied from the tank arrangement to the cathode inlet. For example, the amount of available oxygen based fluid in the tank arrangement, the level of toxic substances present in the ambient environment, and a power supply demand from e.g. the electric traction motor propelling the vehicle. Based on these parameters, the control unit can provide an optimization model for determining the operation, i.e. generation of electric power, of the fuel cell.

According to an example embodiment, the control circuitry may be further configured to control the tank arrangement to reduce the supply of oxygen based fluid to the cathode inlet when the toxic substance level is above the second predetermined threshold limit. The first and second predetermined threshold limits should be construed as dynamic threshold limits which could vary depending on the above described parameters and optimization model for determining the operation of the fuel cell. Hereby, the operation of the fuel cell is reduced with a reduced supply of oxygen based fluid to the cathode inlet.

When the tank arrangement is controlled to inhibit supply of oxygen based fluid, the fuel cell operation is preferably reduced or inhibited. The electric machines propelling the vehicle are in such situation operated by electric power received from an electric power source, e.g. a battery of the vehicle. There is thus no need to supply oxygen based fluid to the fuel cell, whereby draining of the tank arrangement is avoided.

According to an example embodiment, the control circuitry may be further configured to transmit a signal to a data storage software system when the toxic substance level exceeds the predetermined threshold limit, the signal being retrievable by a vehicle maintenance centre for determining component maintenance interval actions caused by toxic substance pollution.

An advantage is that maintenance interval can be properly selected. Hence, service of the fuel cell, filters, etc. can be determined at suitable intervals.

According to a second aspect, there is provided a method of controlling a vehicle fuel cell system, the vehicle fuel cell system comprising a fuel cell configured to generate electric power, the fuel cell comprising an anode side and a cathode side, wherein the anode side comprises an anode inlet configured to receive a hydrogen gas, and wherein the cathode side comprises a cathode inlet configured to receive air, a first air intake conduit having a first end portion connected to the cathode inlet and a second end portion, the second end portion being configured receive air from an ambient environment, and a tank arrangement, the tank arrangement being fluidly connectable to the cathode inlet via a second intake conduit, the method comprising determining an air pollution parameter indicative of a level of toxic substances present in the ambient environment, comparing the toxic substance level with a predetermined threshold limit, and controlling the tank arrangement to supply oxygen based fluid to the cathode inlet when the toxic substance level is above the predetermined threshold limit.

Effects and features of the second aspect are largely analogous to those described above in relation to the first aspect.

According to a third aspect, there is provided a vehicle comprising an electric machine for propelling the vehicle, an energy storage system connected to the electric machine, and a fuel cell system according to any one of the embodiments described above in relation to the first aspect, the fuel cell being connected to the electric machine and to the energy storage system, wherein electric power generated by the fuel cell is controllably deliverable to the electric machine and to the energy storage system.

According to an example embodiment, the control circuitry may be configured to control the vehicle to be propelled by the electric machine solely by electric power received from the energy storage system.

According to a fourth aspect, there is provided a computer program comprising program code means for performing the steps of the above described second aspect when the program code means is run on a computer.

According to a fifth aspect, there is provided a computer readable medium carrying a computer program means for performing the steps of the above described second aspect when the program means is run on a computer.

Effects and features of the third, fourth and fifth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
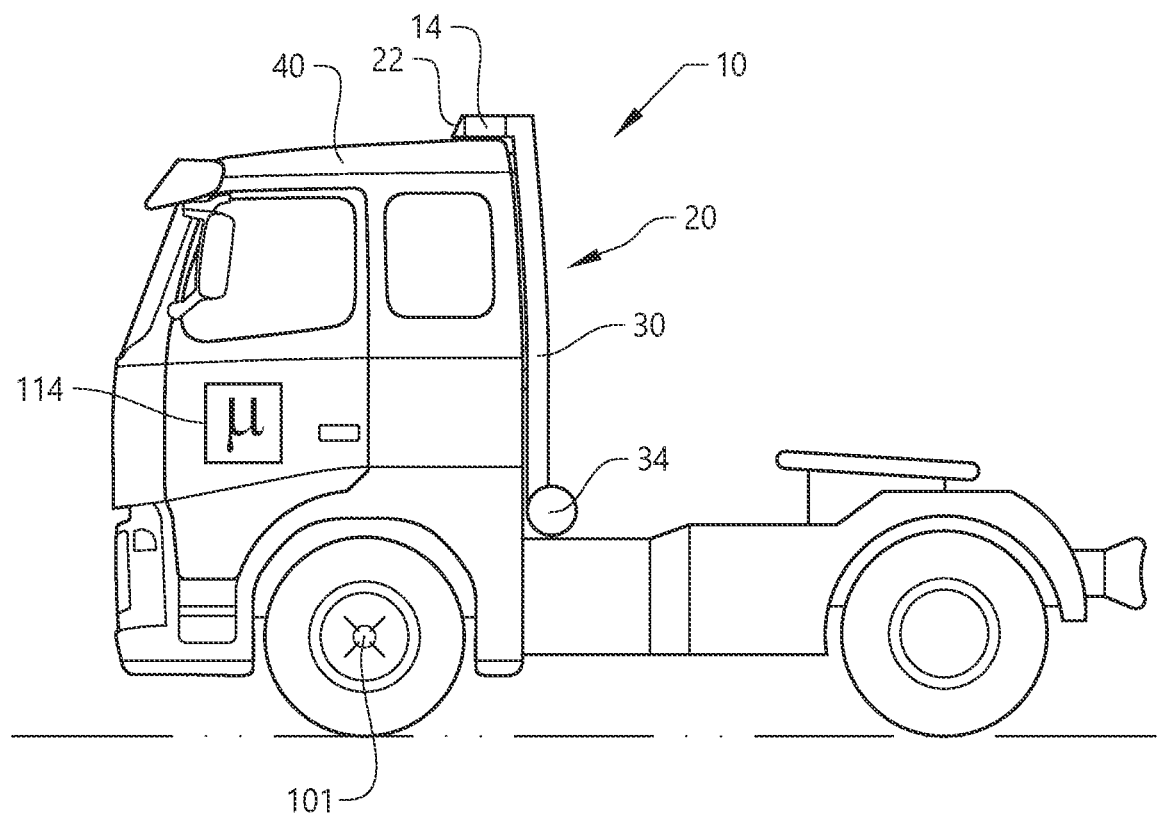
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 10 in the form of a truck. The vehicle comprises a traction motor 101 for propelling the wheels of the vehicle. The traction motor 101 is in the example embodiment an electric machine arranged to receive electric power from a battery or directly from a fuel cell system which is described in further detail below. The vehicle 10 also comprises a control unit 114 for controlling various operations as will also be described in further detail below, and a fuel cell system (not shown in detail in FIG. 1) arranged to generate electric power for supply to a battery or for directly supply to the electric traction motors 101.

The control unit 114 may include a microprocessor, microcontroller, programmable digital signal processor or another programmable device. The control unit 114 may also, or instead, include an application specific integrated circuit, a programmable gate array or programmable array logic, a programmable logic device, or a digital signal processor. Where the control unit 114 includes a programmable device such as the microprocessor, microcontroller or programmable digital signal processor mentioned above, the processor may further include computer executable code that controls operation of the programmable device.

As can be seen in FIG. 1, the vehicle 10 further comprises an air inlet system 20 for receiving ambient air to e.g. above described fuel cell system. The air inlet system 20 comprises a first air intake conduit 30 having an air inlet 22 which draws ambient air into the first air intake conduit 30. The air inlet 22 is exemplified as being positioned on top of the vehicle cabin 40. As will be described in further detail below with reference to FIG. 3, the first air intake conduit 30 is connected to a cathode inlet via an air filter 34. Further, the vehicle 10 also comprises sensor 14 configured to determine/sense a level of toxic substances currently present in the ambient environment. The sensor 14 is exemplified as being positioned at the air inlet 22 of the air inlet system 20 but can of course be arranged at other positions of the vehicle 10.

Figure 2:
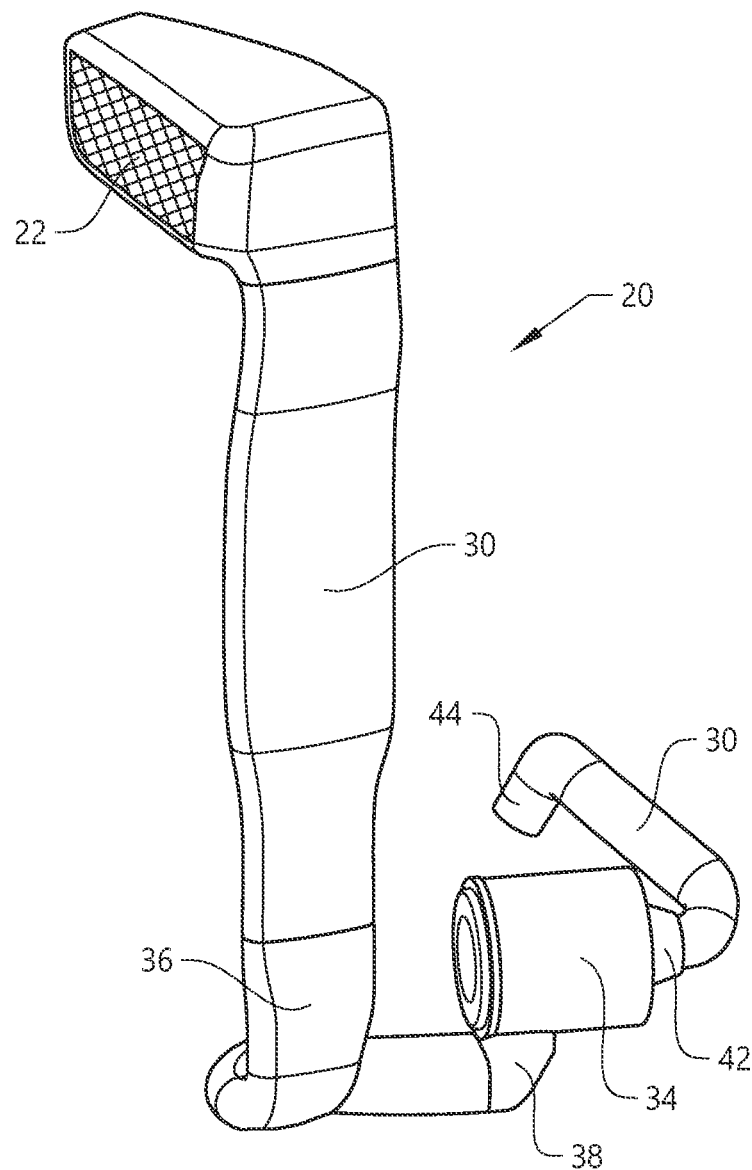
FIG. 2 is a schematic illustration of an air inlet system according to an example embodiment.

Reference is made to FIG. 2 which is a detailed schematic illustration of the air inlet system 20 according to an example embodiment. As can be seen, the air inlet system 20 comprises the above described air inlet 22, the first air intake conduit 30 and the air filter 34. The air inlet system 20 further comprises a bellow 36 and a chamber 38 arranged between the air inlet 22 and the air filter 34. The air inlet system 20 also comprises an air cleaner rubber bellow 42 downstream the air filter 34, and an outlet 44 connected to e.g. a turbine (see 208 in FIG. 3).

Figure 3:
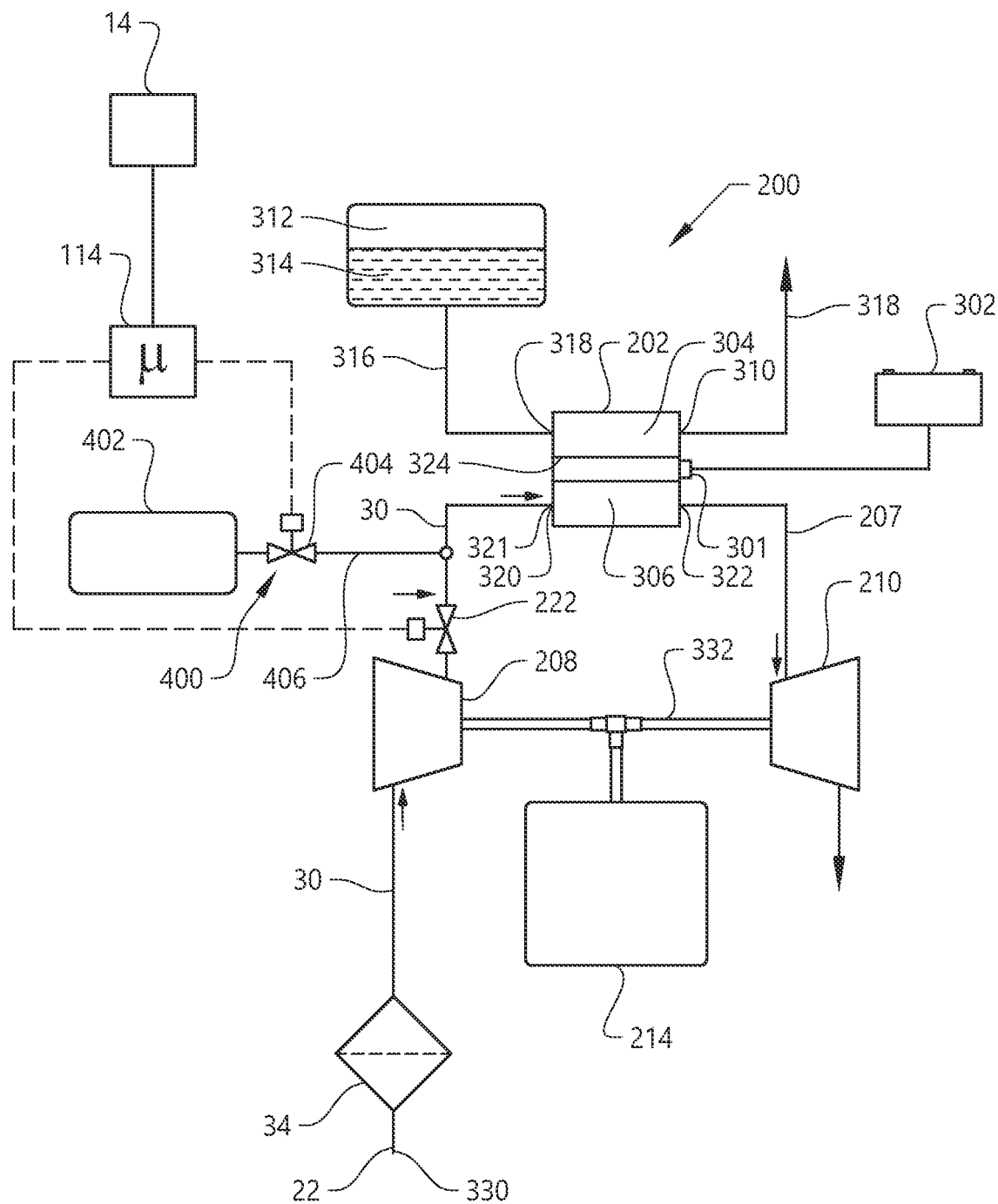
FIG. 3 is a schematic illustration of a fuel cell system according to another example embodiment.

In order to describe the fuel cell system 200 in further detail, reference is now made to FIG. 3. FIG. 3 is a schematic illustration of a fuel cell system 200 according to another example embodiment.

The fuel cell system 200 comprises a fuel cell 200 configured to generate electric power which is supplied to an energy storage system 302 of the vehicle 10 or supplied directly to the electric traction motors 101 for propulsion thereof. The energy storage system 302 is preferably a vehicle battery.

The fuel cell 202 comprises an anode side 304 and a cathode side 306. The anode side 304 comprises an anode inlet 308 and an anode outlet 310. The anode inlet 308 is connected to a hydrogen gas tank 312 configured to contain hydrogen gas 314. The hydrogen gas tank 312 may also contain a gas in liquid fluid form, such as e.g. cryogen. In further detail, the anode inlet 308 is arranged in fluid communication with the hydrogen gas tank 312 by an anode inlet conduit 316. The anode outlet 310 is connected to an anode outlet conduit 318 which is configured to convey excess fuel out from the anode side 304. The excess fuel can preferably be conveyed back to the hydrogen gas tank 312.

The cathode side 306 comprises a cathode inlet 320 and a cathode outlet 322. The cathode inlet 320 is connected to a first end portion 321 of the first air intake conduit 30 for receiving air. The cathode outlet 322 is connected to a cathode outlet conduit 207. The cathode outlet conduit 207 is thus arranged to convey unused gas, such as e.g. oxygen, and sometimes also water out from the cathode outlet 322.

Moreover, the exemplified fuel cell 202 depicted in FIG. 3 also comprises an electrolyte 324 between the anode side 304 and the cathode side 306. The electrolyte 324 is electrically connected to the energy storage system 302 and/or the electric traction motors 101.

During operation of the fuel cell 202, hydrogen gas 314 is supplied into the anode side 304 via the anode inlet conduit 316, and an oxygen agent, such as e.g. air, is supplied into the cathode side 306 through the first air intake conduit 30. The electrolyte 324 allows ions to move between the anode side 304 and the cathode side 306. In further detail, at the anode side 304, a catalyst causes the hydrogen fuel 314 to undergo an oxidation reaction that generates positively charged hydrogen ions and electrons. The hydrogen ions move from the anode side 304 to the cathode side 306 through the electrolyte 324. At the same time, electrons flow from the anode side 304 to the cathode side 306 through an external circuit 301 producing electric current delivered to the energy storage system 302. At the cathode side 306, a further catalyst causes ions, electrons, and oxygen to react, thereby forming water and possibly other products.

As depicted in FIG. 3, the first air intake conduit 30 further comprises the above described air filter 34 arranged downstream a second end portion 330 of the first air intake conduit 30. The second end portion 330 may correspond to the above described air inlet 22. Further, the air intake conduit 30 also comprises a flow controller device 222 and a fuel cell air compressor 208 in fluid communication between the first 321 and second 330 end portions. The flow controller device 222 may, for example, be a valve or an air booster and is arranged to control the flow of ambient air supplied into the cathode inlet 306 of the fuel cell 202.

Moreover, the cathode outlet conduit 207 comprises a fuel cell turbine 210 in downstream fluid communication with the cathode outlet 322. According to the exemplified embodiment in FIG. 3, the fuel cell air compressor 208 and the fuel cell turbine 210 are preferably connected to each other and to a fuel cell motor 214 by means of a shaft 332. The fuel cell motor 214 may thus be used for operating the fuel cell compressor 208 and the fuel cell turbine 210. The fuel cell motor 214 may, for example, receive electric power from the energy storage system 302 for operation.

Accordingly, air is received by the fuel cell compressor 208. The pressurized air from the fuel cell compressor 208 is delivered into the cathode inlet 306 of the fuel cell 202, where the air is used in the above described electrochemical reaction to produce electricity.

Furthermore, the fuel cell system 200 comprises a tank arrangement 400. The tank arrangement 400 comprises a tank 402 configured to contain an oxygen based fluid. The oxygen based fluid is in the following referred to as air but could also be arranged in the form of e.g. dioxygen (O2), nitrous oxide (N2O), etc. The tank arrangement 400 further comprises valve 404 arranged in a second intake conduit 406. The second intake conduit 406 is connected to the first intake conduit 30 at a position between the first 321 and second 330 end portions of the first intake conduit 30. According to the exemplified embodiment depicted in FIG. 3, the second intake conduit 406 is connected to the first intake conduit 30 at a position downstream the flow controller device 222.

Moreover, the above described control unit 114 is electrically connected to the flow controller device 222, the valve 404 in the second intake conduit 406 as well as to the sensor 14. It should however be readily understood that the control unit may equally as well be connected to other components of the fuel cell system 200, such as to the fuel cell motor 214, the fuel cell 202, the fuel cell compressor 208, the fuel cell turbine 210, etc.

The following will now describe the functional operation of the fuel cell system 200. During operation of the vehicle 10, and when the fuel cell 202 produces electricity, the control unit 114 continuously receives data from the sensor 14. The data contains information relating to a level of toxic substances currently present in the ambient environment. If the level of toxic substances is too high, i.e. above a predetermined threshold level, the polluted air entering the fuel cell 202 at the cathode side 306 may negatively harm the fuel cell 202. In detail, if the fuel cell is exposed to toxic substances, the fuel cell 202 may not function in a desired manner, potentially resulting in a lower production of electricity and/or that components of the fuel cell 202 degrade over time or break and stops to function.

Therefore, the control unit 114 compares the level of toxic substances with a predetermined threshold limit. If the level of toxic substances is higher than the predetermined threshold limit, this is an indication that the fuel cell may be negatively affected if the polluted air is supplied into the cathode side 306.

In order to protect the fuel cell 202, the control unit 114, in response to determining that the level of toxic substances is higher than the predetermined threshold limit, therefore controls the tank arrangement 400 to supply air from the air tank 402 to the cathode inlet 306 of the fuel cell 202. In detail, the control unit 114 preferably controls the valve 404 to be arranged in an open position to allow air from the air tank 402 to be transported into the first intake conduit 30 via the second intake conduit 406 and enter the cathode side 306.

The air entering the cathode side 306 may be a combination of ambient air and air from the air tank 402, depending on the level of toxic substances currently present in the ambient environment. If the level of toxic substances is merely slightly over the predetermined threshold limit, it might be sufficient to dilute the ambient air with the air from the air tank 402 to supply sufficiently clean air into the cathode side 306. However, if the level of toxic substances is severely higher than the predetermined threshold limit, i.e. also exceeds a second, higher predetermined threshold limit, the control unit 114 can control the flow controller device 222 to be arranged in a closed position. Hereby, ambient air is prevented from reaching the cathode side 306, whereby the cathode side 306 receives air solely from the air tank 402.

Also, if the level of toxic substances is above the second predetermined threshold limit, the control unit 114 may as an option control the fuel cell 202 to reduce its operation, i.e. reduce its generation of electric power. According to the exemplified embodiment in FIG. 3, this can be done by controlling the fuel cell motor 214 to reduce its operation. When reducing the operation of the fuel cell 202, the control unit 114 can also, as an option inhibit the supply of air from the air tank 402 by controlling the valve 404 to be closed. Thus, since the fuel cell 202 is not operated, there is no need to supply air at all to the cathode inlet 306.

Furthermore, the control unit 114 can also be configured to store the detected level of toxic substances in a memory unit. When detecting that the level of toxic substances exceeds the predetermined threshold limit, the control unit 114 can also be configured to transmit a signal to a vehicle maintenance centre with information of the current toxic substances. The vehicle maintenance centre may hereby determine, based on the data received from the control unit 114, when it is time to execute maintenance, such as filter replacements, etc.

Moreover, in addition, or as an alternative, to receiving the data containing information relating to a level of toxic substances from the sensor 14, the data may be received from nearby vehicles or vehicles that has recently been operated at the road path ahead of the vehicle. The surrounding vehicle(s) may thus transmit a signal to the vehicle, whereby the signal is indicative of the toxic substance level in the ambient air at an upcoming area at which the vehicle is to be operated, i.e. an upcoming point in time. Thus, the control unit 114 can hereby in advance prepare the fuel cell system 200 to be operated in that area. The control unit 114 can ensure that there is a sufficient amount of oxygen based fluid in the tank arrangement. This can be accomplished by controlling, for example, the flow controller device 222 as well as the valve 404 to admit fresh and clean ambient air into the tank arrangement prior to arriving at the area with a high level of toxic substances, i.e. prior to arriving at the upcoming point in time.

The control unit 114 may also be configured to receive the signal indicative of the level of toxic substances by vehicle-to-infrastructure communication, or by means of vehicle map data in combination with statistic toxic level data of areas on the map. Also, the signal may be received by map data in combination with logged data from the ego vehicle, which logged data contains information of the toxic substance levels at positions of the map where the vehicle has been previously operated.

In other words, the control unit 114 may receive a signal indicative of a level of toxic substance present in the ambient environment at a position for operating the vehicle at an upcoming point in time and compare the level with the above described threshold limit. The control unit 114 may determine the level of oxygen based fluid present in the tank arrangement and when the level is below a predetermined oxygen based fluid threshold, the control unit controls the air tank arrangement to receive ambient air before arriving at the position for operating the vehicle at the upcoming point in time. The predetermined oxygen based fluid threshold may be based on the level of oxygen based fluid required for operating the fuel cell during the time period at which the level of toxic substance in the ambient air is determined to be above the predetermined threshold limit. Thus, the predetermined oxygen based fluid may also be based on the SOC level of the energy storage system, etc.

The control unit 114 may also control the fuel cell system to fill the tank arrangement with fresh ambient air during regenerative braking of the vehicle. During regenerative braking, the operation of the fuel cell 202 can be reduced, whereby the fuel cell 202 needs a reduced level of ambient air for its operation. The ambient air can hereby instead be directed into the tank 402 by controlling the flow controller device 222 as well as the valve 404. The fuel cell compressor 208 delivers pressurized air to the tank 402.

By means of the above described invention, it is also possible to expose the fuel cell to an air cleaning process in the unlikely event that toxic substances have entered the cathode inlet. If such situation would occur, the control unit 114 can control the tank arrangement 400 to supply fresh and clean air into the cathode side 306 of the fuel cell to "blow-out" the contaminated air.

Figure 4:
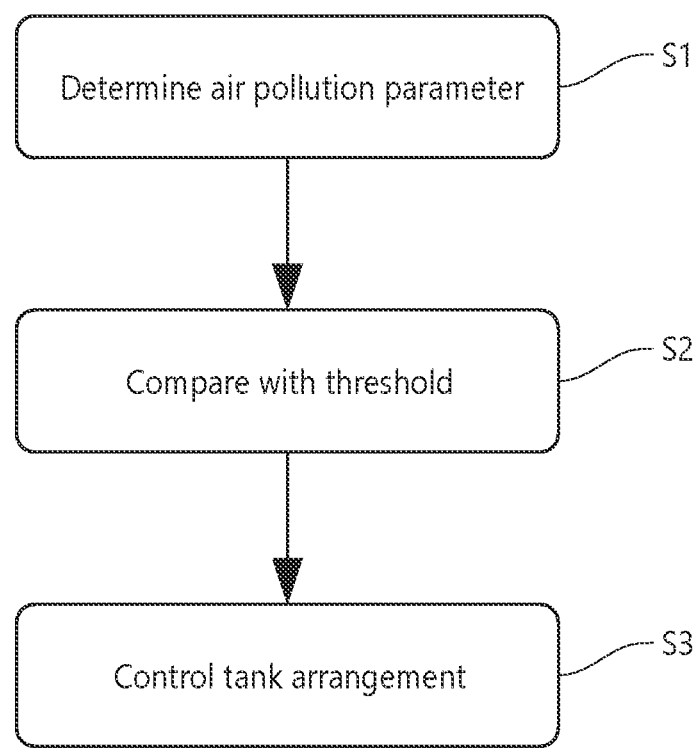
FIG. 4 is a flow chart of a method of controlling the fuel cell system according to an example embodiment.

In order to sum up, reference is made to FIG. 4 which is a flow chart of a method of controlling the fuel cell system according to an example embodiment.

As described above, an air pollution parameter is determined S1. The air pollution parameter is indicative of the above described level of toxic substances present in the ambient environment. The air pollution parameter can, for example, be received from the above described sensor 14. As an option, the air pollution parameter can, in addition or as an alternative, be received in advance according to any of the above described options.

The level of toxic substances is compared S2 with a predetermined threshold limit, and when the level of toxic substance is above the predetermined threshold limit, the tank arrangement 400 is controlled S3 to supply air to the cathode inlet 306 of the fuel cell 202. As described above, the tank arrangement 400 is preferably controlled to supply air to the cathode inlet 306 by arranging the valve 404 in the open state such that air is directed from the air tank 402 to the cathode inlet via the first 30 and second 406 air intake conduits.

It is to be understood that the present disclosure is not limited to the embodiments described above and illustrated in the drawings; rather, the skilled person will recognize that many changes and modifications may be made within the scope of the appended claims.

The invention claimed is:

1. A vehicle fuel cell system, comprising
an energy storage system
a fuel cell configured to generate electric power, the fuel cell being configured to feed electric power to the energy storage system, wherein the fuel cell comprises an anode side and a cathode side, wherein the anode side comprises an anode inlet configured to receive a hydrogen gas, and wherein the cathode side comprises a cathode inlet configured to receive air,
a first air intake conduit having a first end portion connected to the cathode inlet and a second end portion, the second end portion being configured receive air from an ambient environment,
a tank arrangement configured to comprise an oxygen based fluid, the tank arrangement being fluidly connectable to the cathode inlet via a second intake conduit, and
a control unit connected to the tank arrangement, the control unit comprising control circuitry configured to:
receive a signal indicative of a level of toxic substances present in the ambient environment,
compare the toxic substance level with a first predetermined threshold limit,
compare the toxic substance level with a second predetermined threshold limit, the second predetermined threshold limit being higher than the first predetermined threshold limit,
control the tank arrangement to supply oxygen based fluid to the cathode inlet when the toxic substance level is above the first predetermined threshold limit, and
control the fuel cell to reduce generation of electric power when the toxic substance level is above the second predetermined threshold limit, the reduction of generation of electric power being based on a state of charge level of the energy storage system.

2. The vehicle fuel cell system according to claim 1, wherein the second intake conduit is connected to the first intake conduit at a position between the first and second end portions of the first air intake conduit.

3. The vehicle fuel cell system according to claim 1, wherein the tank arrangement comprises a valve, the valve being controllable between a first state in which oxygen based fluid from the tank arrangement is supplied to the cathode inlet, and a second state in which oxygen based fluid in the tank arrangement is prevented from reaching the cathode inlet.

4. The vehicle fuel cell system according to claim 1, wherein the first air intake conduit comprises a flow controller device connected to the control unit, the flow controller device being configured to controllably supply air from the ambient environment to flow from the second end portion to the first end portion.

5. The vehicle fuel cell system according to claim 4, wherein the control circuitry is further configured to:

control the flow controller device to reduce the supply of air from the ambient environment to flow from the second end portion to the first end portion when the toxic substance level is above the predetermined threshold limit.

6. The vehicle fuel cell system according to claim 4, wherein the flow controller device is one of an air booster or a valve.

7. The vehicle fuel cell system according to claim 1, wherein the vehicle fuel cell system further comprises a sensor configured to determine the level of toxic substances in the ambient environment, wherein the control circuitry being configured to receive the signal indicative of the toxic substance level present in the ambient environment from the sensor.

8. The vehicle fuel cell system according to claim 1, wherein the control circuitry is further configured to:
control the tank arrangement to reduce the supply of oxygen based fluid to the cathode inlet when the toxic substance level is above the second predetermined threshold limit.

9. The vehicle fuel cell system according to claim 1, wherein the control circuitry is further configured to:
transmit a signal to a data storage software system when the toxic substance level exceeds the predetermined threshold limit, the signal being retrievable by a vehicle maintenance centre for determining component maintenance interval actions caused by toxic substance pollution.

10. A vehicle comprising an electric machine for propelling the vehicle, an energy storage system connected to the electric machine, and a fuel cell system according to claim 1, the fuel cell being connected to the electric machine and to the energy storage system, wherein electric power generated by the fuel cell is controllably deliverable to the electric machine and to the energy storage system.

11. The vehicle according to claim 10, wherein the control circuitry is configured to control the vehicle to be propelled by the electric machine solely by electric power received from the energy storage system.

\* \* \* \* \*